United States Patent
McDaniel et al.

(10) Patent No.: US 8,320,627 B2
(45) Date of Patent: Nov. 27, 2012

(54) MACHINE CONTROL SYSTEM UTILIZING STEREO DISPARITY DENSITY

(75) Inventors: Michael S. McDaniel, Peoria, IL (US); Susmita Dutta, Waukesha, WI (US)

(73) Assignee: Caterpillar Inc., Peoria, IL (US)

( * ) Notice: Subject to any disclaimer, the term of this patent is extended or adjusted under 35 U.S.C. 154(b) by 345 days.

(21) Appl. No.: 12/817,530

(22) Filed: Jun. 17, 2010

(65) Prior Publication Data

US 2011/0311102 A1 Dec. 22, 2011

(51) Int. Cl.
*G06K 9/00* (2006.01)
*H04N 13/04* (2006.01)

(52) U.S. Cl. ............ 382/104; 382/274; 348/51

(58) Field of Classification Search ......... 382/100, 382/103–107, 154, 162, 168, 172, 173, 181, 382/199, 232, 254, 274, 276, 291, 305, 312; 348/14.02, 14.1, 51
See application file for complete search history.

(56) References Cited

U.S. PATENT DOCUMENTS

| | | | |
|---|---|---|---|
| 5,383,013 A | 1/1995 | Cox | |
| 5,867,591 A | 2/1999 | Onda | |
| 6,658,136 B1 | 12/2003 | Brumitt | |
| 6,865,289 B1 * | 3/2005 | Berestov | 382/154 |
| 7,054,479 B2 * | 5/2006 | Aucsmith et al. | 382/154 |
| 7,106,899 B2 * | 9/2006 | Zhang et al. | 382/154 |
| 7,587,081 B2 * | 9/2009 | Rovira-Mas et al. | 382/154 |
| 2008/0304705 A1 * | 12/2008 | Pomerleau et al. | 382/103 |
| 2009/0010495 A1 | 1/2009 | Schamp et al. | |
| 2009/0180682 A1 | 7/2009 | Camus | |

* cited by examiner

Primary Examiner — Seyed Azarian
(74) Attorney, Agent, or Firm — Finnegan, Henderson, Farabow, Garrett & Dunner LLP

(57) ABSTRACT

A control system for a mobile machine is disclosed. The control system may have a first sensor mounted on the mobile machine and configured to capture a first image of a region near the mobile machine, a second sensor mounted on the mobile machine and configured to capture a second image of the region, and a controller in communication with the first and second sensors. The controller may be configured to generate a stereo image from the first and second images, compute a disparity map of the stereo image, and generate an output to affect operation of the machine when a density of the disparity map is less than a threshold density.

18 Claims, 3 Drawing Sheets

MACHINE CONTROL SYSTEM UTILIZING STEREO DISPARITY DENSITY

TECHNICAL FIELD

The present disclosure relates generally to a machine control system and, more particularly, to a system that utilizes stereo disparity density to control operations of a mobile machine.

BACKGROUND

Machines such as off-highway haul trucks, motor graders, snow plows, and other types of heavy equipment are used to perform a variety of tasks. Some of these tasks involve carrying or pushing large, awkward, loose, and/or heavy loads up steep inclines or along rough or poorly marked haul roads. Because of the size and momentum of the machines and/or because of poor visibility, these tasks can be difficult for a human operator alone to complete effectively.

To help guide the machines safely and efficiently along the haul roads, some machines are equipped with sensors, for example cameras, located on a front end of each machine. These sensors are often connected to a visual display and/or a guidance system of the machine such that control over machine maneuvering may be enhanced or even automated by two-dimensional images provided by the sensors.

When multiple two-dimensional sensors scan the same region from different positions onboard the machine, differences in the resulting images can be used to determine three-dimensional aspects of the region. That is, objects at different distances from the sensors project images to the sensors that differ in their positions and/or size, giving the depth cue known as disparity. By matching particular features (e.g., pixels, boundary lines, etc.) from the images produced by each sensor, and then comparing the disparity between the matched features, the size, location, and orientation of the matched features in the scanned region can be determined, processed, and used to simulate a three-dimensional environment.

A quality of the simulated three-dimensional environment can be represented by a number of features that are matched between the two images and subsequently used for disparity calculations. This quality parameter is known as a disparity density. When the disparity density is high (i.e., when many of the features from each sensor's image are matched), it can be concluded that both sensors are producing accurate images of the same object or region. When the disparity density is low, it can be concluded that one or both of the sensors are experiencing some kind of impairment. The impairments can include, among other things, rain, snow, dust, fog, debris, etc. When one or both of the sensors are impaired, reliance on the simulated environment for machine control may not be appropriate.

U.S. Patent Publication No. 2009/0180682 (the '682 publication) of Camus published on Jun. 16, 2009 discloses a system and method for ensuring that only good stereo images are processed and used for machine control based on disparity calculations. Specifically, the '682 publication describes capturing images from a left camera and a right camera, and producing a single stereo disparity image from the two captured images. The stereo disparity image is then divided into three parts, including a left third, a center third, and a right third. Each third of the stereo disparity image is then scrutinized to determine a disparity measure representing a quality of the stereo disparity image. To compute the disparity measure, a number of edge discontinuities between adjacent regions in each image third are summed and subtracted from a number of valid image pixels, then divided by a total number of image pixels in the image third. Based on the disparity measure, a disparity algorithm defines the image as valid or invalid. A small number of large cohesive disparity regions will increase the disparity measure, while a larger number of small, fragmented regions will decrease the disparity measure. If the stereo disparity image is determined to be valid (i.e., if the disparity measure falls within a specific threshold), the disparity image is further processed for object and collision detection. However, if the disparity image is determined to be invalid (i.e., if the disparity measure falls outside the threshold value), the disparity image is ignored and new left and right images are obtained from each of the cameras to repeat the process.

Although the method of the '682 publication may help ensure that machine control is not implemented based on images from an impaired camera, the method may do little to improve the image produced by the impaired camera or to affect machine control differently when the camera is impaired. Instead, the system of the '682 publication may simply slow down or stop working altogether when one or both cameras becomes impaired.

The disclosed control system is directed to overcoming one or more of the problems set forth above and/or other problems of the prior art.

SUMMARY OF THE INVENTION

In one aspect, the present disclosure is directed to a control system for a mobile machine. The control system may include a first sensor mounted on the mobile machine and configured to capture a first image of a region near the mobile machine, a second sensor mounted on the mobile machine and configured to capture a second image of the region, and a controller in communication with the first and second sensors. The controller may be configured to generate a stereo image from the first and second images, compute a disparity map of the stereo image, and generate an output to affect operation of the machine when a density of the disparity map is less than a threshold density.

In yet another aspect, the present disclosure is directed to a method of controlling a mobile machine. The method may include capturing a first image of a region near the mobile machine from a first location onboard the mobile machine, capturing a second image of the region from a second location onboard the mobile machine, and generating a stereo image from the first and second images. The method may also include computing a disparity map of the stereo image, and generating an output to affect operation of the mobile machine when a density of the disparity map is less than a threshold density.

DETAILED DESCRIPTION

Figure 1:
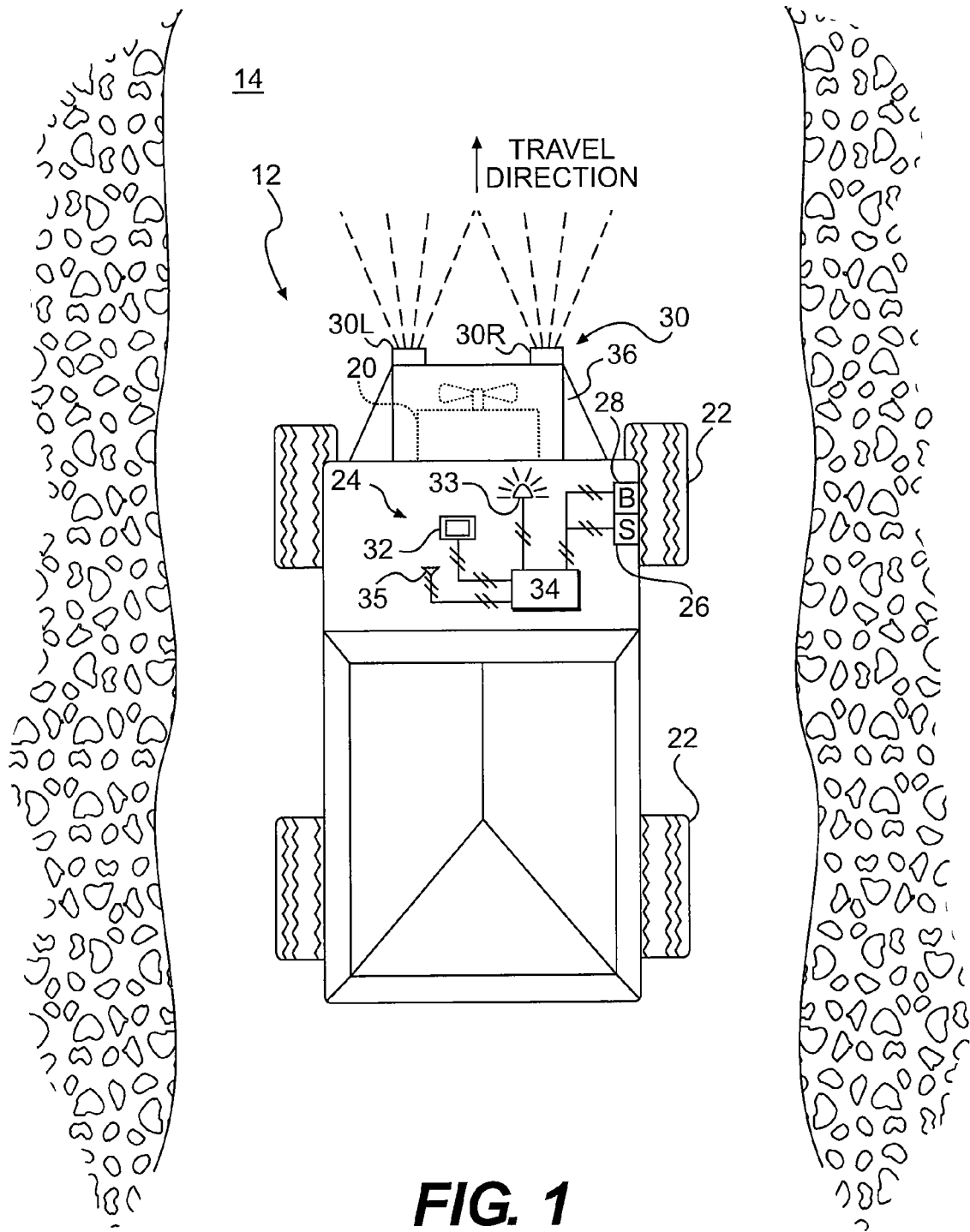
FIG. 1 is a diagrammatic illustration of an exemplary disclosed machine.

FIG. 1 illustrates a worksite 10 and an exemplary machine 12 performing a specialized task at worksite 10. Worksite 10 may include, for example, a mine site, a landfill, a quarry, a construction site, or any other type of worksite having a roadway 14 traversable by machine 12. Although shown in FIG. 1 as a single lane roadway, it is contemplated that roadway 14 may alternatively include multiple lanes or an open excavation surface, if desired.

The task being performed by machine 12 may be associated with altering the geography at worksite 10 and may include, for example, a hauling operation, a grading operation, a leveling operation, a plowing operation, a bulk material removal operation, or any other type of operation. As such, machine 12 may embody a mobile machine, for example a haul truck, a motor grader, a loader, or a snow plow. Machine 12 may include, among other things, a power source 20, one or more traction devices 22, and a control system 24. Power source 20 may generate and provide power to traction devices 22 to propel machine 12, while control system 24 may selectively affect operations of machine 12 in response to various input.

Power source 20 may embody an internal combustion engine such as, for example, a diesel engine, a gasoline engine, a gaseous fuel powered engine, or any other type of engine apparent to one skilled in the art. Power source 20 may alternatively or additionally include a non-combustion source of power such as a fuel cell, a power storage device, an electric motor, or other similar mechanism. Power source 20 may be connected to drive traction devices 22 via a direct mechanical coupling, a hydraulic circuit, an electrical circuit, or in any other suitable manner.

Traction device 22 may be a wheel, a belt, a track or any other driven traction device known in the art. Traction device 22 may be driven by power source 20 to rotate and propel machine 12 in accordance with an output rotation of power source 20. A steering device 26, for example a hydraulic cylinder, a hydraulic motor, an electric motor, and/or a rack-and-pinion configuration may be associated with one or more traction device 22 to affect steering thereof. In addition, a braking mechanism 28, for example a compression disk brake, an internal fluid brake, an engine retarder, an exhaust brake, and/or a transmission brake may be associated with one or more traction device 22 and/or power source 20 to affect braking of machine 12.

Control system 24 may include multiple components that interact to affect operations of machine 12. Specifically, control system 24 may include two or more sensors 30, a display 32, a warning device 33, a communications device 35, and a controller 34. Controller 34 may be in communication with power source 20, sensors 30, display 32, warning device 33, communication device 35, steering device 26, and braking mechanism 28, and be configured to automatically control maneuvering (i.e., steering, fueling, and/or braking) of machine 12 and/or provide warnings and recommendations to an operator of machine 12 or to operators of other machines 12 at worksite 10 based on input received from sensors 30 and/or from an operator of machine 12.

Sensors 30 may be attached to a body 36 of machine 12 to capture an image of a region near machine 12 in a travel direction (e.g., a region substantially forward of machine 12). Each sensor 30 may embody an image scanning device, for example a camera. FIG. 1 illustrates a left camera 30L being spaced horizontally apart from a right camera 30R. It is contemplated, however, that sensors 30 may alternatively or additionally be spaced apart from each in a vertical direction, if desired, and that any number of sensors 30 may be attached to machine 12. Each of left and right cameras 30L, 30R may be configured to capture an image that includes at least a portion of the region in front of machine 12 from a different location onboard machine 12, and send the images to controller 34 for further processing. Because left and right cameras 30L, 30R may be positioned at different locations onboard machine 12, disparities may exist between overlapping portions of the images captured by left and right cameras 30L, 30R. As will be described in more detail below, these disparities may be used by controller 34 to generate a stereo (i.e., 3-D) image from the images captured by left and right cameras 30L, 30R.

Display 32 may be any appropriate type of device that provides a graphics user interface (GUI) for presentation of results and information to operators and other users of machine 12. For example, display 32 may be a computer console or cab-mounted monitor.

Warning device 33, when activated by controller 34, may provide a warning and/or recommendation to an operator of machine 12. The warning and recommendation may be audible, visual, or a combination of both audible and visual stimulation.

Communications device 35 may embody any mechanism that facilitates the exchange of data between machines 12 and/or between machine 12 and an offboard device, for example a site controller or database. Communications device 35 may include hardware and/or software that enables each machine 12 to send and/or receive data messages through a direct data link (not shown) or a wireless communication link. The wireless communications may include, for example, satellite, cellular, infrared, and any other type of wireless communications that enable machines 12 to wirelessly exchange information.

Controller 34 may embody a single or multiple microprocessors, field programmable gate arrays (FPGAs), digital signal processors (DSPs), etc. that include components for affecting an operation of machine 12 in response to images received from sensors 30. Numerous commercially available microprocessors can be configured to perform the functions of controller 34. It should be appreciated that controller 34 could readily embody a microprocessor separate from that controlling other machine functions, or that controller 34 could be integral with a general machine microprocessor and be capable of controlling numerous machine functions and modes of operation. If separate from the general machine microprocessor, controller 34 may communicate with the general machine microprocessor via datalinks or other methods. Various other known circuits may be associated with controller 34, including power supply circuitry, signal-conditioning circuitry, actuator driver circuitry (i.e., circuitry powering solenoids, motors, or piezo actuators), and communication circuitry.

As described above, controller 34 may be configured to generate a stereo image from the overlapping portions of the separate images captured by left and right cameras 30L, 30R. The stereo image may include three-dimensional depth information that can be reconstructed from the two captured images using one or more predetermined algorithms. The pre-determined algorithms may function by mathematically relating a known spacing on machine 12 between left and right cameras 30L, 30R with disparities in common pixels (e.g., pixels from each image that correspond with the same real world object) that have been matched from the left and right images. This process of generating the stereo image is well known in the art and will not be described in detail in this disclosure.

After controller 34 generates the stereo image, a quality of the stereo image may be determined. In one embodiment, the quality of the stereo image may be determined by computing a disparity map of the stereo image (i.e., a map of disparities associated with each common pixel location that has been matched between the captured images), determining a density of the disparities within the map, and comparing the disparity density to a threshold density. For the purposes of this disclosure, disparity density may be considered a measure of the number of common pixels that have been matched between the images captured by left and right cameras 30L, 30R. When the disparity density of the disparity map (or particular regions of interest within the map) is less than the threshold density, it may be concluded that the stereo image (or the corresponding particular region within the image) is of poor quality and may not be trustworthy. When the computed disparity density is equal to or greater than the threshold density, it may be concluded that the stereo image (or the particular region) is of acceptable quality and can be trusted.

In one embodiment, the threshold density used to determine the quality of the stereo image may be adjustable. In particular, the threshold density may be adjusted based on a travel speed of machine 12, a type of machine 12, a condition of machine 12 and/or worksite 10, a characteristic or preference of an owner/operator of machine 12, or based on any other condition known in the art. For example, as a speed, a size, or a load of machine 12 increases, the threshold density may likewise increase. Similarly, as road conditions at worksite 10 degrade, the threshold density may again increase. Additionally, the threshold density may increase or decrease by an amount related to a condition of machine 12 and/or an operator's experience or ability with regard to machine 12. In general, any change in the conditions of machine 12, worksite 10, and/or the operator of machine 12 that makes control of machine 12 more difficult, may result in an increase in the threshold density. The threshold density may be manually adjusted or automatically adjusted by controller 34 in response to various input. In this way, potential risk associated with operation of machine 12 under difficult conditions may be reduced.

Figure 2:
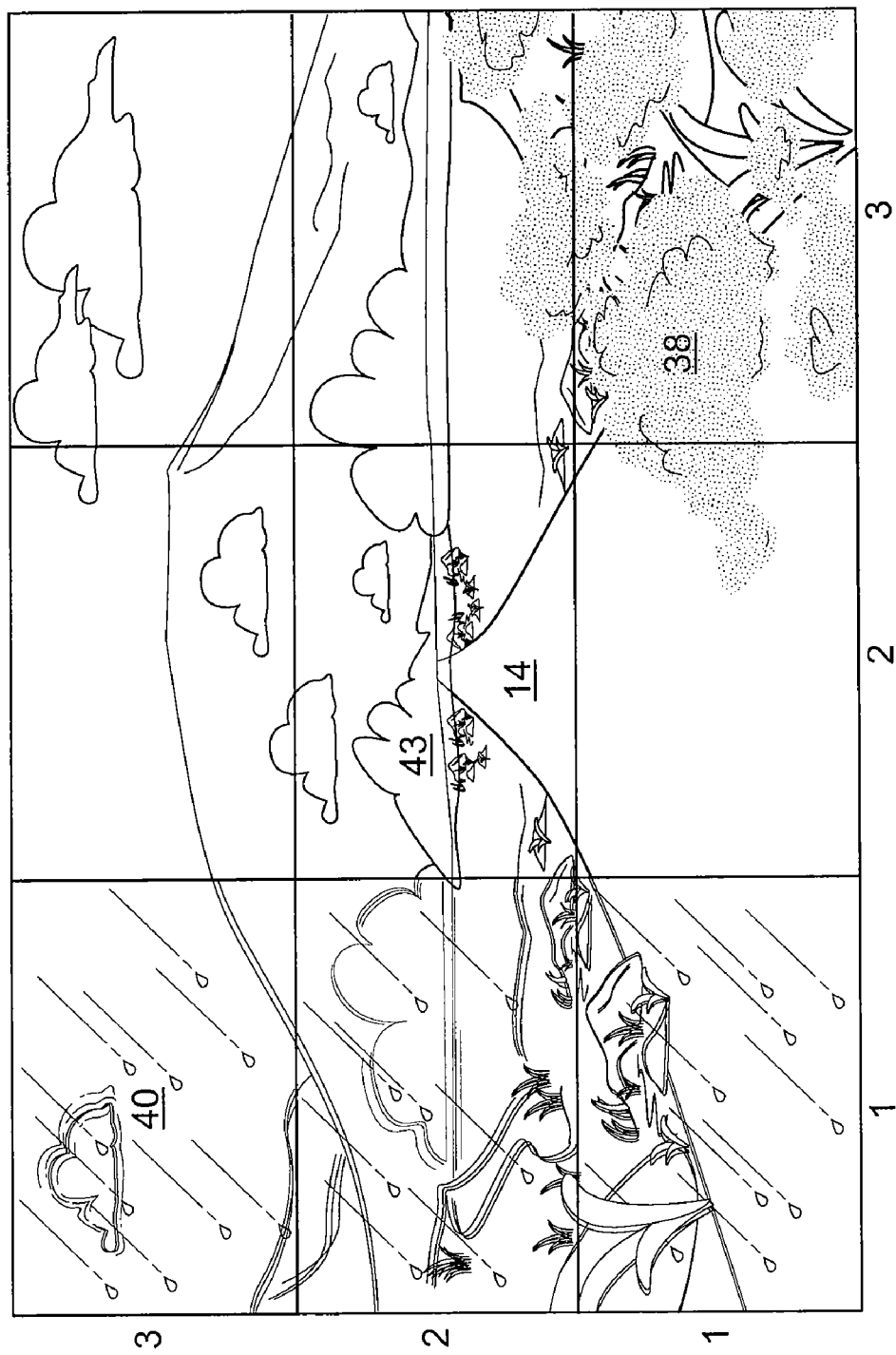
FIG. 2 is a pictorial illustration of a scanned view associated with the machine of FIG. 1.

It is contemplated that the stereo image produced by controller 34 may be divided into multiple zones. For example, FIG. 2 illustrates a stereo image generated by controller 34 that has been divided by a 3×3 grid into nine different zones. It should be noted that any number of zones may be utilized. Controller 34 may compute a disparity map and associated disparity density of each individual zone to determine a quality of the stereo image in that zone. Controller 34 may then compare the disparity density of each zone to the threshold density.

In one embodiment, particular zones of the stereo image may be more important than other zones. For example, the zone shown in FIG. 2 as corresponding with grid position 2-1 (i.e., column 2, row 1) may represent an area directly in front of machine 12 that will immediately be traversed by machine 12. If this zone contained an obstacle, immediate maneuvers may be required for machine 12 to avoid the obstacle and, accordingly, this zone may be classified by controller 34 as a critical zone. In contrast, however, the zone corresponding with grid position 1-3 may represent an area above machine 12 and to the left of roadway 14. This zone may never be entered by any portion of machine 12 during travel of machine 12 and, accordingly, may be classified by controller 34 as non-critical. The number, size, and criticality of each zone may be selected by an operator of machine 12 or by controller 34 based on known geometry and operating conditions of machine 12 (e.g., based on a travel speed or direction of machine 12), and changed at any time.

The threshold density for each zone of the stereo image may have a value corresponding to the importance of the zone. For example, the zone corresponding with grid position 2-1, which was classified by controller 34 as being a critical zone, may have a higher threshold density than the non-critical zone corresponding with grid position 1-3. It is contemplated that the threshold density value may be manually assigned to each zone or, alternatively, automatically assigned based on a criticality of each zone.

When it is determined by controller 34 that the stereo image (or a region of interest within the image) is of sufficient quality (i.e., when the disparity density at a corresponding location in the disparity map is equal to or greater than the threshold density), controller 34 may regulate operations of machine 12 and/or display the stereo image to an operator of machine 12 according to preprogrammed instructions. These operations may include, among other things, autonomous or semi-autonomous control over fueling, steering, braking, etc., of machine 12.

When, however, it is determined by controller 34 that the stereo image is of poor quality (i.e., when the disparity density at the corresponding location in the disparity map is less than the threshold density), controller 34 may generate an output to affect operation of machine 12 in a manner different than when the stereo image is of acceptable quality. A poor quality image can be caused by a number of different impairments to one or both of left and right cameras 30L, 30R. When one or both of left and right cameras 30L, 30R are impaired, the number of common pixels that are matched between the images captured by left and right cameras 30L, 30R will be low. Typical impairments can include, for example, obstructions blocking one or both of cameras 30L, 30R such as air-borne dust (represented by element 38 in FIG. 2), smoke, precipitation (represented by element 40 in FIG. 2), fog (represented by element 42 in FIG. 2), debris, etc. These impairments may correspond with low visibility from an operator's perspective on machine 12. Other impairments may alternatively correspond with sensor malfunction.

Controller 34 may generate an output to affect operation of machine 12 when the disparity density of the disparity map or the disparity density of a particular zone within the disparity map is less than the threshold density. In one example, the output may be associated with machine control. Specifically, controller 34, in response to a low disparity density value that could potentially correspond with a low visibility situation, may automatically activate headlights of machine 12, reduce a speed of machine 12 via braking mechanism 28, or automatically steer machine 12 away from the region of low visibility via steering mechanism 26. Alternatively or additionally, controller 34 may provide a message to an operator of machine 12 or to operators of other machines 12 at worksite 10 warning of the potential for low visibility or regarding recommended actions to change a control parameter such as braking or steering. In addition, controller 34 may display representations of the stereo image, the disparity map, and/or corresponding visibility measures on display 33 within machine 12.

Controller 34 may be further configured to receive information from other machines 12 operating at worksite 10. In particular, controller 34 may receive via communications device 35 messages from other machine controllers 34 regarding the potential for low visibility or recommend actions to change control parameters. In addition, it is contemplated that a centrally-located site controller (not shown) may receive messages from the controller 34 of each machine 12 operating at worksite 10, and generate a general site map, if desired, the site map showing all locations of potential low visibility. This site controller could then communicate the site map to each of the different machines 12 at worksite 10 for use in control of individual machines 12.

It is further contemplated that portions of a stereo image or the disparity map generated by the controller 34 of one machine 12 operating at worksite 10 may be selectively communicated to the controller 34 of another machine 12 also operating at worksite 10. For example, if multiple similar machines 12 are traveling in a column along the same roadway 14, and a sensor(s) 30 of a trailing machine 12 experiences an impairment at a particular location on roadway 14 that results in low disparity density within a particular zone of the disparity map, it may be possible for a leading machine 12 having already passed through that particular location without any sensor impairment to provide a previously-recorded replacement stereo image or disparity map corresponding with the zone having a low disparity density (i.e., a zone having a disparity density less than a corresponding threshold density). In this manner, the trailing machine 12 may be provided with or be able to create a high quality stereo image that can be used to effectively control operations of machine 12, even though that particular machine 12 may be currently experiencing a sensor impairment. This situation may occur, for example, when dust blows across roadway 14 behind the leading machine 12 but in front of the trailing machine 12, thereby causing low visibility for only the trailing machine 12. Similar information may be communicated between machines 12 that are at different locations within or are approaching from a different direction a storm, fog, or smoke-filled pass.

Figure 3:
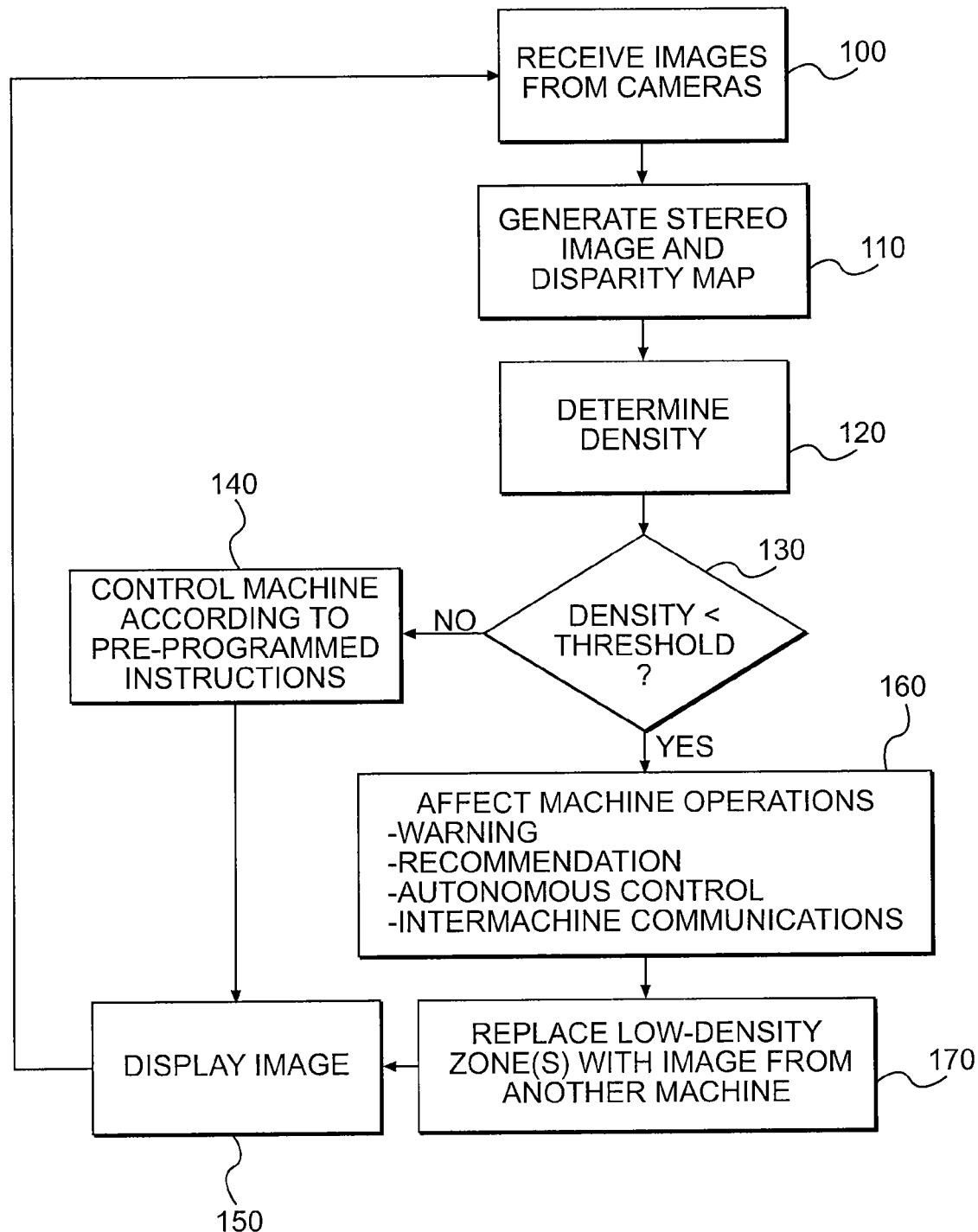
FIG. 3 is a flowchart depicting an exemplary operation of the machine of FIG. 1.

FIG. 3 illustrates an exemplary method performed by controller 34 during operation of machine 12. FIG. 3 will be described in more detail in the follow section to better illustrate the disclosed system and its operation

INDUSTRIAL APPLICABILITY

The disclosed control system may be applicable to any mobile machine where quality of a provided three-dimensional representation of machine environment is important. The disclosed control system may generate the three-dimensional representation and check the representation for quality. When a low quality representation is detected, the disclosed control system may provide warnings, control recommendations, and autonomous machine maneuvering. In addition, the disclosed control system may communicate with other co-located machines to improve the representation. Operation of control system 24 will now be described.

As machine 12 is traveling along roadway 14, control system 24 may continuously receive images captured by left and right cameras 30L, 30R (Step 100). From the captured images, and more specifically from disparities between overlapping portions of the captured images, and based on the known geometrical relationship between the locations of left and right cameras 30L, 30R, controller 34 may generate a three-dimensional stereo image. Controller 34 may also compute a corresponding map of the disparities (Step 110), and then determine a density of the disparities within the map (Step 120).

Controller 34 may compare the disparity density of the disparities in the map with a threshold density (Step 130). As described above, the stereo image may be divided into zones and, as such, controller 34 may be configured to compare the density of disparities within a particular zone, with a threshold density defined for that zone. If the density of disparities within the particular zone of the disparity map is sufficiently high (e.g., greater than the threshold density) (Step 130: No), controller 34 may control machine 12 according to one or more pre-programmed instructions (Step 140). The stereo image may be presented on display 32 (Step 150), and control may return to step 100 to repeat the process.

If, however, at step 130, it is determined that the density of disparities within the particular zone of the disparity map is low (i.e., less than the threshold density) (Step 130: Yes), controller 34 may conclude that sensor impairment exists, and responsively affect machine operations (Step 160). For example, in the stereo image of FIG. 2, dust 38 is shown in the lower right zone corresponding to grid location 3-1, precipitation 40 is shown in the upper left zone corresponding to grid location 1-3, and fog 42 is shown in the middle zone corresponding to grid location 2-2. These impairments may negatively affect the image(s) captured by one or both of left and right cameras 30L, 30R, causing a loss in the number of matches between common pixels of the two images. Because of the impairments and corresponding low number of pixel matches, the stereo image in these areas may be low quality and a confidence that the stereo image accurately represents the real world environment may also be low.

Controller 34 may implement a number of different actions based on the low disparity density and based on the particular zone in which the low disparity density is detected. For example, because the illustrated impairments may be affecting only non-critical zones in FIG. 2, for example areas that are inaccessible by machine 12 or a long distance from machine 12, controller 34 may only provide a warning to the operator of machine 12 regarding the potential for low visibility. Additionally or alternatively, controller may provide a recommendation to the operator, for example to slow down or to turn on headlights. If however, the impairment was detected within a critical zone such as the zone corresponding to grid location 2-1, controller 34 may be configured to activate braking mechanism 28 and slow machine 12 to an acceptable speed corresponding to the visibility with the critical zone or to activate steering mechanism 26 to avoid the critical zone altogether. In addition, controller 34 may communicate information to other machines 12 or to a site controller regarding the potential for low visibility in zones 3-1, 1-3, and 2-2. This information may be used to control machines 12, update a site map, and/or implement actions to improve visibility (e.g., by arranging for a water truck to spray roadway 14 and thereby reduce the dust in particular areas of worksite 10).

In addition to affecting operations of machine 12 based on the disparity density of the disparity map, controller 34 may also or alternatively attempt to improve the stereo image. In particular, controller 34 may communicate with other machines 12 co-located at worksite 10 and/or with a site controller to receive high quality portions of the stereo image generated by those other machines 12 and that correspond with the zones of low disparity density. For example, machine 12, as it moves through a particular location at worksite 10 may encounter blowing dust that impairs one or both of left and right cameras 30L, 30R. At this same location during an earlier trip, the same or a different machine may have passed through without any impairment and produced and recorded a high quality stereo image. Accordingly, controller 34 of machine 12 may determine which zones of the current stereo image have low disparity density, and replace those portions of the stereo image with portions of a previously-generated stereo image having high disparity density (Step 170). In this manner, controller 34 may improve the current stereo image by replacing low-quality portions of the image with higher-quality data from a older stereo image. It is contemplated that, in some situations, only non-critical zones having low disparity density may be replaced. Once the stereo image has been improved with replacement zones, the improved stereo image may be presented on display 33 (Step 150), and control may return to step 100 to repeat the process.

Several benefits may be associated with the disclosed control system. For example, the disclosed control system may allow operation of machine 12 during impairment of sensors 30. In addition, the disclosed control system may still be able to generate a high quality stereo image, even when sensors 30 are impaired. Further, the disclosed control system may facilitate communications between machines 12 and/or between a site controller and machines 12 that improve site coordination and conditions.

It will be apparent to those skilled in the art that various modifications and variations can be made to the control system of the present disclosure. Other embodiments will be apparent to those skilled in the art from consideration of the specification and practice of the control system disclosed herein. For example, although this disclosure describes creation of a stereo image before or simultaneous with creation of a disparity map, it is contemplated that the disparity map may alternatively be created before the stereo image, if desired. It is intended that the specification and examples be considered as exemplary only, with a true scope of the disclosure being indicated by the following claims and their equivalents.

What is claimed is:

1. A control system for a mobile machine, comprising:
    a first sensor mounted on the mobile machine and configured to capture a first image of a region at a worksite of the mobile machine;
    a second sensor mounted on the mobile machine and configured to capture a second image of the region; and
    a controller in communication with the first and second sensors, the controller being configured to:
    generate a stereo image from the first and second images;
    compute a disparity map of the stereo image; and
    generate an output to affect operation of the mobile machine when a density of the disparity map is less than a threshold density, wherein the threshold density is adjustable based on at least one of a speed of the mobile machine, a type of the mobile machine, a condition of the mobile machine, a worksite condition, or an operator preference.

2. The control system of claim 1, wherein the output is an automated command that alters at least one of a speed or a direction of the mobile machine.

3. The control system of claim 1, wherein the output is a message directed to an operator of the mobile machine.

4. The control system of claim 1, wherein the output is a recommendation directed to an operator of the mobile machine to change a control parameter of the mobile machine.

5. The control system of claim 1, further including a display device located inside the mobile machine, wherein the controller is further configured to display at least one of the stereo image or a representation of the disparity map on the display device.

6. The control system of claim 1, wherein the controller is further configured to:
    divide the disparity map into multiple zones;
    compute the density of each of the multiple zones; and
    generate the output when the density for at least one of the multiple zones is less than the threshold density.

7. The control system of claim 6, wherein the threshold density is different for different zones of the multiple zones.

8. The control system of claim 7, wherein at least one of the multiple zones is classified as a critical zone and has a threshold density higher than threshold densities of other zones of the multiple zones.

9. The control system of claim 8, wherein the controller is further configured to receive from another mobile machine co-located at a common worksite portions of a replacement stereo image corresponding with zones of the multiple zones having a density less than a corresponding threshold density.

10. The control system of claim 6, wherein at least one of a size or a number of zones is adjustable based on at least one of a speed of the mobile machine, a type of the mobile machine, a condition of the mobile machine, a worksite condition, or an operator preference.

11. The control system of claim 1, wherein the controller is configured to generate a visibility map associated with a worksite at which the mobile machine operates based on the disparity map.

12. The control system of claim 11, further including a communication device configured to communicate at least one of the stereo image, the disparity map, or the visibility map to an offboard device.

13. A method of controlling a mobile machine, comprising:
    capturing a first image of a region at a worksite of the mobile machine from a first location onboard the mobile machine;
    capturing a second image of the region from a second location onboard the mobile machine;
    generating a stereo image from the first and second images;
    computing a disparity map of the stereo image; and
    generating an output to affect operation of the mobile machine when a density of the disparity map is less than a threshold density, wherein the threshold density is adjustable based on at least one of a speed of the mobile machine, a type of the mobile machine, a condition of the mobile machine, a worksite condition, or an operator preference.

14. The method of claim 13, wherein the output is at least one of an automated command that reduces a speed of the mobile machine, a visibility warning directed to an operator of the mobile machine, and a recommendation directed to the operator to change a control parameter of the mobile machine.

15. The method of claim 13, further including dividing the disparity map into multiple zones, wherein:
    computing includes computing the density of each of the multiple zones;
    generating the output includes generating the output when the density for at least one of the multiple zones is less than the threshold density; and
    the threshold density is different for different zones of the multiple zones.

16. The method of claim 15, further including classifying at least one of the multiple zones as a critical zone, wherein the threshold density for the critical zone is higher than threshold densities of other zones of the multiple zones.

17. The method of claim 16, further including receiving from another mobile machine co-located at a common worksite portions of a replacement stereo image corresponding with zones of the multiple zones having a density less than a corresponding threshold density.

18. A mobile machine, comprising:
    a body;
    a power source;
    traction devices connected to the body and driven by the power source to propel the mobile machine;
    a first camera mounted on the body and configured to capture a first image of a region at a worksite of the mobile machine;
    a second camera mounted on the body and configured to capture a second image of the region; and a controller in communication with the first and second cameras, the controller being configured to:
  generate a stereo image from the first and second images;
  compute a disparity map of the stereo image; and
  generate at least one of an automated command that reduces a speed of the traction devices, a visibility warning directed to an operator of the mobile machine, and a recommendation directed to the operator to change a control parameter of the mobile machine when a density of the disparity map is less than a threshold density, wherein the threshold density is adjustable based on at least one of a speed of the mobile machine, a type of the mobile machine, a condition of the mobile machine, a worksite condition, or an operator preference.

* * * * *